(12) United States Patent
Oliveira et al.

(10) Patent No.: US 12,536,157 B2
(45) Date of Patent: Jan. 27, 2026

(54) REPORT MANAGEMENT SYSTEM

(71) Applicant: ADP, INC., Roseland, NJ (US)

(72) Inventors: Israel Oliveira, Porto Alegre (BR);
Allan Barcelos, Porto Alegre (BR);
Renata Palazzo, Porto Alegre (BR);
Leandro Bianchini, Porto Alegre (BR);
Fernanda Tosca, Porto Alegre (BR)

(73) Assignee: ADP, Inc., Roseland, NJ (US)

( * ) Notice: Subject to any disclaimer, the term of this patent is extended or adjusted under 35 U.S.C. 154(b) by 0 days.

(21) Appl. No.: 18/110,641

(22) Filed: Feb. 16, 2023

(65) Prior Publication Data

US 2023/0281188 A1    Sep. 7, 2023

Related U.S. Application Data

(63) Continuation of application No. 16/983,785, filed on Aug. 3, 2020, now abandoned.

(51) Int. Cl.
| | | |
|---|---|---|
| *G06F 16/23* | (2019.01) | |
| *G06F 16/25* | (2019.01) | |
| *G06F 40/169* | (2020.01) | |
| *G06N 5/04* | (2023.01) | |
| *G06Q 10/067* | (2023.01) | |
| *G06Q 10/105* | (2023.01) | |

(52) U.S. Cl.
CPC ........ *G06F 16/2379* (2019.01); *G06F 16/252* (2019.01); *G06F 40/169* (2020.01); *G06N 5/04* (2013.01); *G06Q 10/067* (2013.01); *G06Q 10/105* (2013.01)

(58) Field of Classification Search
CPC .. G06F 16/2379; G06F 16/252; G06F 40/169; G06N 5/04; G06Q 10/067; G06Q 10/105
See application file for complete search history.

(56) References Cited

U.S. PATENT DOCUMENTS

| | | | |
|---|---|---|---|
| 10,019,716 B1 * | 7/2018 | Ainslie | ................ G06Q 30/016 |
| 10,853,103 B2 * | 12/2020 | Zhu | ..................... G06F 9/44505 |
| 11,157,954 B1 | 10/2021 | Belanger et al. | |
| 11,295,375 B1 * | 4/2022 | Chitrapura | ............. G06Q 50/01 |
| 11,614,923 B2 * | 3/2023 | Burnett | ................ G06F 16/252 |
| | | | 717/109 |
| 2008/0082495 A1 | 4/2008 | Polo-Malouvier et al. | |
| 2011/0219011 A1 * | 9/2011 | Carmel | ................... G06F 16/00 |
| | | | 707/E17.143 |

(Continued)

OTHER PUBLICATIONS

US Office Action issued in corresponding U.S. Appl. No. 16/983,785, dated Aug. 17, 2022 (19 pages).

(Continued)

*Primary Examiner* — Courtney Harmon
(74) *Attorney, Agent, or Firm* — Foley & Lardner LLP

(57) ABSTRACT

A method, computer system, and computer program product are provided for generating reports. Existing reports are collected and modeled to determine a number of contexts. An index of the existing reports is generated according the contexts determined by the modeling, a predicted context of a new report is predicted according to the modeling. According to the index, suggested reports are identified based on the predicted context for the new report. The suggested reports are presented in a graphical user interface.

20 Claims, 7 Drawing Sheets

(56) References Cited

U.S. PATENT DOCUMENTS

| | | |
|---|---|---|
| 2013/0159926 A1 | 6/2013 | Vainer et al. |
| 2019/0139153 A1* | 5/2019 | Grant ..................... G06N 5/022 |
| 2019/0340516 A1* | 11/2019 | Kumar ..................... G06N 5/02 |
| 2020/0074359 A1* | 3/2020 | Subramanian ........ G06F 16/387 |
| 2020/0176098 A1* | 6/2020 | Lucas ..................... G16H 10/60 |
| 2021/0109915 A1* | 4/2021 | Godden ................. G16H 10/60 |
| 2022/0180290 A1* | 6/2022 | Xin ......................... G06F 40/40 |
| 2022/0237230 A1 | 7/2022 | Zovic et al. |

OTHER PUBLICATIONS

US Office Action issued in corresponding U.S. Appl. No. 16/983,785, dated May 23, 2022 (20 pages).

* cited by examiner

REPORT MANAGEMENT SYSTEM

CROSS-REFERENCE TO RELATED APPLICATIONS

This application priority and benefit under 35 U.S.C. § 120 as a continuation of U.S. Ser. No. 16/983,785, filed Aug. 3, 2020, the contents of which are is hereby incorporated by reference herein in its entirety.

BACKGROUND INFORMATION

1. Field

The present disclosure relates generally to an improved computer system and, in particular, to a method and apparatus for managing reports. Still more particularly, the present disclosure relates to a method and apparatus for creating new reports for applications.

2. Background

Information systems are used for many different purposes. The different operations performed using the information system may be referred to as transactions. For example, an information system may be used to process payroll to generate paychecks for employees in an organization. The different operations performed to generate paychecks for a pay period using the information system may be referred to as a transaction.

Additionally, an information system also may be used by a human resources department to maintain benefits and other records about employees. For example, a human resources department may manage health insurance, wellness plans, and other programs in an organization using an employee information system. As yet another example, an information system may be used to determine when to hire new employees, assign employees to projects, perform reviews for employees, and other suitable operations for the organization.

Other uses of information systems include purchasing equipment and supplies for an organization. In yet another example, information systems may be used to plan and rollout a promotion of a product for an organization.

Often times, an operator may desire to generate a report for a particular type of transaction. Currently, the operator may use report generator software to generate reports that are human readable from different sources such as databases in the information systems. Currently available report generator software are often more difficult to use than desired.

This type of software requires the operator to have knowledge about how information is stored to select what information to use in a report. For example, the operator may need to know what fields, tables, or columns in the database should be selected for including desired information in the report.

As a result, an operator may need to have experience or training with respect to report generator software and databases in addition to the experience and training to perform the transaction for which the report is being generated. This additional skill may limit the number of operators who are able to generate reports. Additionally, operators who do not generate reports very often may find that report generating may take more time and may be more difficult than desired.

Therefore, it would be desirable to have a method and apparatus that take into account at least some of the issues discussed above, as well as other possible issues. For example, it would be desirable to have a method and apparatus that overcome the technical problem with operators being unable to generate reports as efficiently as desired without knowledge about how the information is stored.

SUMMARY

An embodiment of the present disclosure provides a computer-implemented a method for generating reports. Existing reports are collected and modeled to determine a number of contexts. An index of the existing reports is generated according the contexts determined by the modeling, a predicted context of a new report is predicted according to the modeling. According to the index, suggested reports are identified based on the predicted context for the new report. The suggested reports are presented in a graphical user interface.

Another embodiment of the present disclosure provides a system for generating reports. The system comprises a bus system and a storage device connected to the bus system. The storage device stores program instructions that are executed by a number of processors. The number of processors execute the program instructions to collect existing reports. The number of processors further execute the program instructions to model the existing reports to determine a number of contexts of the existing reports. The number of processors further execute the program instructions to generate an index of the existing reports according the contexts determined by the modeling. The number of processors further execute the program instructions to predict, according to the modeling, a predicted context of a new report. The number of processors further execute the program instructions to identify, according to the index, suggested reports based on the predicted context for the new report. The number of processors further execute the program instructions to present the suggested reports in a graphical user interface.

Another embodiment of the present disclosure provides a computer program product for managing reports. The computer program product comprises a computer readable storage media and program code stored thereon. The program code includes code for collecting existing reports. The program code further includes code for modeling the existing report to determine a number of contexts of the existing reports. The program code further includes code for generating an index of the existing reports according to the contexts determined by the modeling. The program code further includes code for predicting, according to the modeling, a predicted context of the new report. The program code further includes code for identifying, according to the index, suggested reports based on the predicted context for the new report. The program code further includes code for presenting the suggested reports in a graphical user interface.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that the process currently used to generate reports may be more cumbersome and difficult than desired. For example, an operator, who desires to generate a report for a transaction being performed using an application, exits or leaves the application and starts a new application for generating reports, such as currently used report generator software.

The illustrative embodiments also recognize and take account that currently available report generator software uses the names of columns, fields, tables, or other data structures in presenting selections to an operator. The illustrative embodiments recognize and take into account that often times, the names used in a database may not be the same as the name of the field as displayed in the application used by the operator to perform the transaction.

Thus, those embodiments provide a method and apparatus for managing reports. In particular, a method may be present that helps an operator generate a new report more quickly and easily as compared to currently available report generator software.

In one illustrative example, a method is present a computer-implemented a method for generating reports. Existing reports are collected and modeled to determine a number of contexts. An index of the existing reports is generated according the contexts determined by the modeling, a predicted context of a new report is predicted according to the modeling. According to the index, suggested reports are identified based on the predicted context for the new report. The suggested reports are presented in a graphical user interface.

As used herein, "a group of," when used with reference to items, means one or more items. For example, "a group of reports" is one or more reports. Further, "a number of," when used with reference to items, means one or more items. For example, "a group of contexts" is one or more contexts.

A field is a space that holds a piece of data. The space may be, for example, in a location in a record for a database. As another example, the space may be in a location of memory of a computer system. When the space is in an application, the space may be in a data structure in the application.

Figure 1:
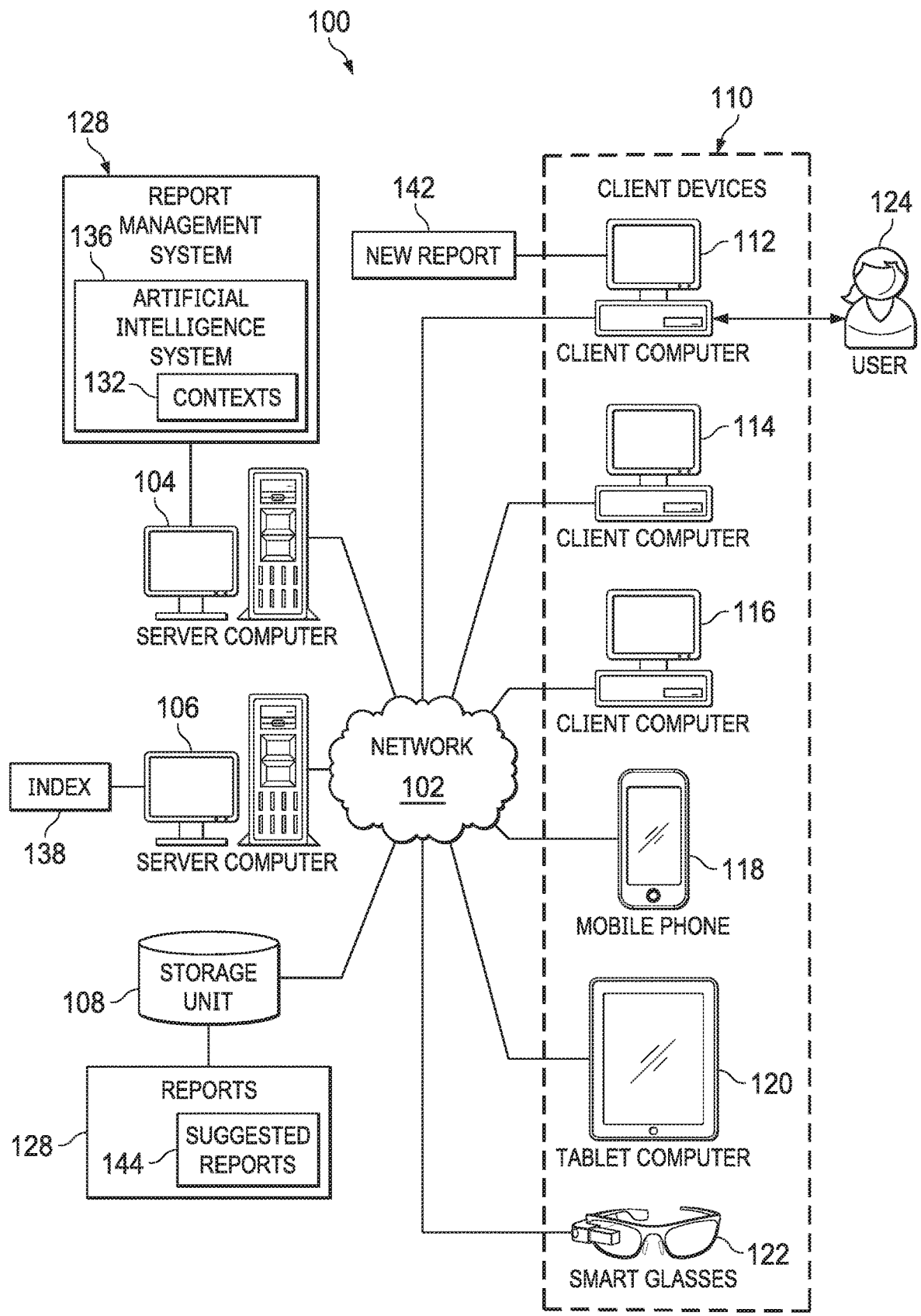
FIG. 1 is a pictorial representation of a network of data processing systems depicted in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet-of-things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "a set of" or "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, user 124 can use client computer 112 to interact with report management system 126. Report management system 126 is an application for creating and managing reports. Every report created by report management system 126 has a purpose and an objective, which leads to the intention of the report owner.

In this illustrative example, report management system 126 collects existing reports 128. Existing reports 128 have been previously generated from a large data set. Existing reports 128 can be generated from one or more fields in the large data set.

Fields are spaces for pieces of data. For example, in a relational database table, the columns of the table are the fields. The rows of the table are records. The records in the table are values for the fields. Fields are spaces where pieces of data are located. These pieces of data are used to perform transactions. For example, in a payroll application, the fields can include at least one of salary, tax information, or other suitable types of payroll data.

The sheer number of fields, such as at least one other field 134, in some data sets sometimes makes the users struggle with traditional reporting applications, and could lead them to be confused about which fields, filters, derived or calculated fields they should select. However, users typically know their report subject (context) and what kind of information they want put into a report.

Using artificial intelligence system 136, report management system 126 models existing reports 128 to determine a number of contexts 132 of the existing reports 128. Contexts 132 provide relevant information about the entire report, about the other fields (or features) of the report. Contexts 132 are the intents of existing reports 128. Contexts 132 characterize the intention of Existing reports 128, based only for the fields within the existing reports 128.

In this illustrative example, Report management system 126 generates an index 138 of the existing reports 128 according the contexts 132 determined by the modeling, index 138 provides a well defined set of context and indexes, that enable report management system 126 to search existing reports 128, and to recommend other fields to a user when composing or completing a in-progress report.

In this illustrative example, Report management system 126 uses the modeling to predict the context of a new report 142. Based on the index 138, report management system 126 identifies suggested reports 144 from the existing reports 128, and presents the suggested reports in a graphical user interface.

When artificial intelligence system 136 is included in Report management system 126, report management system 126 overcomes a technical problem of quickly and easily generating new reports. Report management system 126 characterizes the context of the existing reports 128, enabling those reports to be searched based on their intended purpose and objective.

As a result, this technical solution to the technical problem of generating reports provides a technical effect in which a new reports are generated more easily and quickly while requiring less knowledge or training from an operator.

Figure 2:
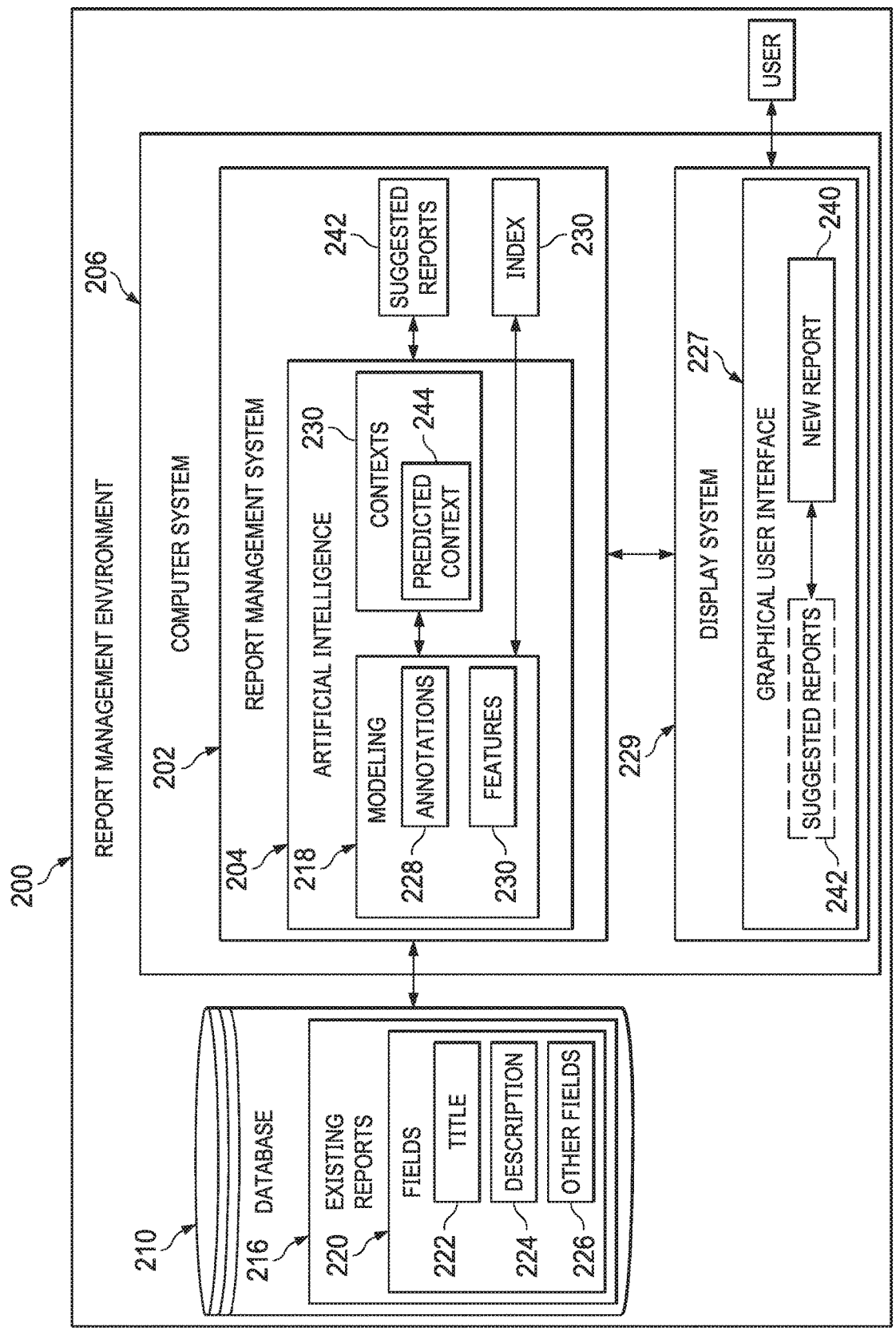
FIG. 2 is a block diagram of report processing environment depicted in accordance with an illustrative embodiment.

With reference now to FIG. 2, a block diagram of report processing environment is depicted in accordance with an illustrative embodiment. In this illustrative example, report management environment 200 includes components that can be implemented in hardware such as the hardware shown in network data processing system 100 in FIG. 1.

In this illustrative example, report management system 202 operates to generate reports 206 using artificial intelligence 204. In this illustrative example, artificial intelligence 204 can be used to more efficiently generate reports 206 as compared to other report management systems that do not have artificial intelligence 204.

An artificial intelligence system is a system that has intelligent behavior and can be based on function of the human brain. An artificial intelligence system comprises at least one of an artificial neural network, and artificial neural network with natural language processing, a cognitive system, a Bayesian network, a fuzzy logic, an expert system, a natural language system, a cognitive system, or some other suitable system.

Machine learning is used to train the artificial intelligence system. Machine learning involves inputting data to the process and allowing the process to adjust and improve the function of the artificial intelligence system.

A cognitive system is a computing system that mimics the function of a human brain. The cognitive system can be, for example, IBM Watson available from International Business Machines Corporation.

In this illustrative example, artificial intelligence 204 is located in computer system 210 and comprises modeling 218 for training a set of artificial intelligence models. When trained, each of these artificial intelligence models be used to characterize the context of reports 206.

Computer system 210 is a physical hardware system and includes one or more data processing systems. When more than one data processing system is present in computer system 210, those data processing systems are in communication with each other using a communications medium. The communications medium may be a network. The data processing systems may be selected from at least one of a computer, a server computer, a tablet, or some other suitable data processing system. When a number of processors execute instructions for a process, the number of processors can be on the same computer or on different computers in computer system 210. In other words, the process can be distributed between processors on the same or different computers in computer system 210.

As depicted, modeling 218 in artificial intelligence training system 214 in computer system 210 operates to train artificial intelligence 204 for use in characterizing the context of reports 206. In other words, modeling 218 artificial intelligence training system 214 trains one or more artificial intelligence models.

Modeling 218 can be implemented in software, hardware, firmware or a combination thereof. When software is used, the operations performed by modeling 218 can be implemented in program code configured to run on hardware, such as a processor unit. When firmware is used, the operations performed by modeling 218 can be implemented in program code and data and stored in persistent memory to run on a processor unit. When hardware is employed, the hardware may include circuits that operate to perform the operations in modeling 218.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As depicted, modeling 218 identifies existing reports 216. Modeling 218 trains artificial intelligence 204 by creating one or more models of existing reports 216. As depicted, the training is performed using a set of machine learning algorithms.]

In this illustrative example, each existing report 216 includes fields 220. As depicted, fields 220 include title field 222, description field 224, and at least one other field in fields 226.

Modeling 218 models existing reports 216 by generating annotations 228 for the existing reports 216 according to a title field 222 and a description field 224. Modeling 218 then determines a number of contexts 230 for the number of existing reports 216 according to the annotations 228.

In one exemplary algorithm, modeling 218 generates annotations 228 for existing reports 216, considering only the title field 222 and description field 224. As part of the annotation process, two or more (M) contexts (like classes, C) are defined with a unique key term (the label, L) for each context and a set of exclusive terms (T) that represent the respective context:

$$C_i = \{L_i, T_i\}$$

$$T_i = \{t_1, t_2, \ldots t_N\}$$

for i-th context.

From fields 220 of existing reports 216, with text typed fields, like title, tags, description etc., modeling 218 cheeses N relevant fields (f), in general title and description, to annotate each report. The label is defined to context with more terms matched:

$$i^* = \underset{i}{\mathrm{argmax}} NT_f(T_i, R_j)$$

$$L_f(R_j) = L_{i^*}$$

with NTf (·) the number of terms in Ti matched in field f of report j.

In one illustrative example, when a plurality of fields 220 are used for annotation (two or three), modeling 218 sum the labels L, defining new labels. The final annotated label (L(R$_j$)) for a j-th report may be achieved with a combined of the labels L$_f$ for f=1, . . . . N:

$$L(R_j) = \sum_{f=1}^{N} L_f(R_j)$$

in other words, each of existing reports 216 may be of one or more contexts 230.

In one illustrative example, artificial intelligence 204 may comprise a heuristic that provides a desired level of intelligence when generating annotations 228 for existing reports 216. For example:

---
Result: Report label
Heuristic Annotation (Text, C) is
| M = size (C);
| s = Vector [M];
| for j in {1,..., M} do
| | s[j] = 0;
| | T = C[j].T;
| | N = size(T);
| | for n in {1,..., N} do
| | | s[j] = s[j] + matches (Text,T) // partial or full matching times of T in Text
| | | end
| end
| //Return the label of the context with more matches (s[i*]=max(s), i*:
return C[s.indexOf(max(s))].L
---

After generating annotations 228, modeling 218 defines the features 232 of existing reports 216. For example, in the case of human resources reports, other fields in fields 226 may include fields such as First Name, Last Name, Job Description, Job position, and First Address, as well as other suitable fields. The at least one other field in fields 226 of each existing report 216 characterize the context of the report, for example, a Head Count, Turnover, Performance, and Payroll, as well as other suitable fields. Features 232 may include names of the other fields 226. Additionally, features 232 may include a category of the field, type of aggregation, possible type of filters, and type of aggregation. In one illustrative example, modeling 218 considers features 232 of: a name of the field (such as for example, first name, last name), a category of the field (such as, for example, profile, earnings) and a filter type (such as, for example, by job position, by department).

In this illustrative example, modeling 218 can represent a j-th report (Rj) as:

$$R_j = \{L_j, F_j, FC_j, FT_j\}$$

$$F_j = \{fn_1, fn_2, \ldots, fn_n\}$$

$$FC_j = \{fc_1, fc_2, \ldots, fc_m\}$$

$$FT_j = \{ft_1, ft_2, \ldots, fc_p\}$$

with label $L_j$ given during annotation process, a set $F_j$ of unique names of the fields in $R_j$, a set $FC_j$ of unique categories from the fields are grouped and the unique set $FT_j$ of filters.

In one illustrative example, For each context (label) annotated, modeling 218 applies a scoring method of counting unique occurrences for each value in other fields 226. Modeling 218 then normalizes the total number of occurrences, ranking it and choosing the max sum of values.

Defined the structure of features, the ranking is build using a set of annotated reports. The scores φ, γ and δ area a normalization of theirs counting occurrences for each labelled context. The model (M(·)) have the ranks (ψ) of each feature (F, FC and FT) for each i-th label:

$$\Psi_i = \{L_i, \Phi_i, \Gamma_i, \Delta_i\}$$

$$\Phi_i = \{(fn_1, \phi_1), (fn_2, \phi_2), \ldots, (fn_n, \phi_n)\}$$

$$\Gamma_i = \{(fc_1, \gamma_1), (fc_2, \gamma_2), \ldots, (fc_m, \gamma_m)\}$$

$$\Delta_i = \{(ft_1, \delta_1), (ft_2, \delta_2), \ldots, (ft_p, \delta_p)\}$$

Modeling 218 insurers the maximum probability of an annotated label for given values. To consider a possible difference of relevance between the fields, for example, features 232, each ranked field is weighted by a value between 0 and 1. In one illustrative example, modeling 218 uses a parameter optimizer To achieve these weights. The parameter optimizer can be, for example, a genetic algorithm, a gradient boost, as well as other suitable optimizers.

Modeling 218 predicts contexts 230 of a given existing report 216, returning the label (context) that maximizes the probability of this report have the predicted label:

$$M(R) = \arg\max_L P(L, R)$$

Modeling 218 can use any suitable method to achieve the scores, such as simply counting, tf-idf, and Lift, as well as other suitable methods. In one illustrative example, modeling 218 adds the scores of the matched terms for each label and chooses the label with the highest sum.

In this illustrative example, modeling 218 can validate training performed on artificial intelligence 204 using validation data, which can include in and use subset of existing reports 216. Modeling 218 analyzes the process and results of validation data to determine whether artificial intelligence 204 performs with a desired level of accuracy.

When a desired level of accuracy is reached, report management system 202 generates index 234 of the existing reports according the contexts 230 determined by the modeling 218. From modeling 218, report management system 202 can predict predicted context 244 of a new report 240. According to the index 234, Report management system 202 can identify suggested reports 242 from the existing reports 216 based on the predicted context 244 for the new report 240. The suggested reports 242 can be presented in a graphical user interface 227 of a display system 229 of a client device, such as one or more of client devices 110 of FIG. 1.

Computer system 210 can be configured to perform at least one of the steps, operations, or actions described in the different illustrative examples using software, hardware, firmware or a combination thereof. As a result, computer system 210 operates as a special purpose computer system in which modeling 218 in computer system 210 enables training an artificial intelligence system to generate new reports. In the illustrative example, the use of artificial intelligence 204 in computer system 210 integrates processes into a practical application for a method of training an artificial intelligence system that increases the performance of computer system 210. In other words, artificial intelligence 204 into in computer system 210 is directed towards a practical application of processes integrated into modeling 218 in computer system 210 that identifies intentions from previously generated reports.

In this illustrative example, artificial intelligence system 204 for in computer system 210 utilizes annotations to train an artificial intelligence system using one or more machine learning algorithms in a manner that that results in an artificial intelligence system that is capable of identifying report intentions with a desired level of accuracy. In this manner, artificial intelligence system 204 for in computer system 210 provides a practical application of a method for training an artificial intelligence system to characterize a report such that the functioning of computer system 210 is improved when using the trained artificial intelligence system.

Figure 3:
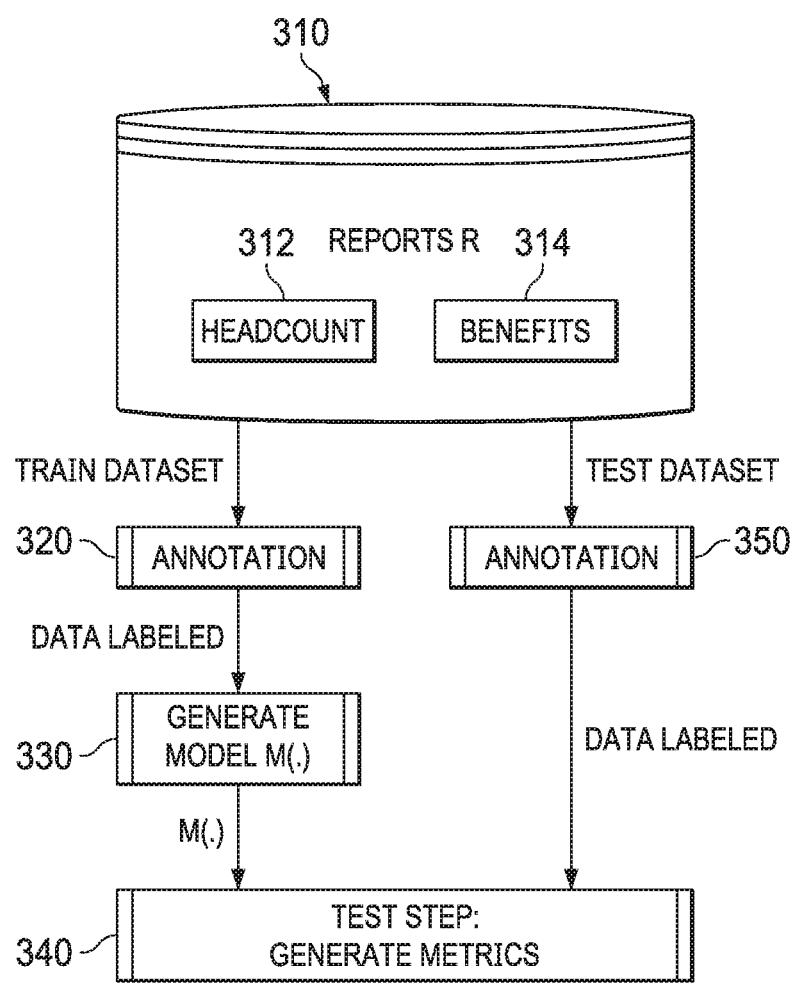
FIG. 3 is a data flow diagram for modeling existing reports in the context of a human resources system according to an illustrative embodiment.

FIG. 3 depicts a data flow diagram for modeling existing reports in the context of a human resources system according to an illustrative embodiment. The data flow of FIG. 3 is one example in which report management system 202 of FIG. 2 can be implemented in a human resources environment.

In this illustrative example, reports 310 consider two sets of human resources reports with size of N (e.g.: 1000 reports) each set, well randomised. Consider two samples of a HR reports: headcounts 312 and benefits 314.

In this illustrative example, headcounts 312 includes the following fields, values, and applied filters:
  Description: This report shows the headcount for engineering dept.
  Fields: Name, Department and Status.
  Filters: Department=engineering and Status=Active.
    Report B: Title: Benefits.
In this illustrative example, benefits 314 includes the following fields, values, and applied filters:
  Description: This report shows the benefits for all employees from construction dept.
  Fields: Name, Department, 401k Status, ACA Status.
  Filters: Department=construction and Status=Active.
Despite the fact that each of reports 310 have a title, the intention or context of each reports 310 it is not clearly defined. Using all available text from title and description annotation 320 extracts possible contexts from reports 310.

The context are extracted with a annotation heuristic (1). The annotation process considers only the title and description fields, running for this two reports. For report A, the label is HEADCOUNT; and for report B, the label is BENEFITS. In this cases, each label may have one or more key words, based on the title and description fields. All labels are given a priori.

Generate Model M(·) 330, for each label, calculates the frequency of fields and filters. In the current example, given the two labels:
  Label HEADCOUNT: Label (L): HEADCOUNT.
    Fields (F): f1=(Name, 0.98), f2=(Department, 0.94), . . . .
    Field cat. (FC): fc1=(Employee Profile, 0.89), fc2=(Job Profile, 0.87), . . . .
    Filters (FT): tf1=(Status=VALUE, 0.83), tf2=(Department=VALUE, 0.76), . . . . Label BENEFITS: Label (L): BENEFITS.
    Fields (F): f1=(401k Status, 0.98), f2=(Status, 0.94), . . . .

Field cat. (FC): fc1=(Benefit Types, 0.89), fc2=(Job Profile, 0.87), . . . .

Filters (FT): tf1=(Status=VALUE, 0.90), tf2=(Department=VALUE, 0.86), . . .

Test Step 340 uses the model generated at step 330, to predict a context for all reports in dataset passed by annotation 350. In this illustrative example, the context of reports passed by annotation 350 is a label predicted using only the fields, field categories and filters as features of the model. Test step 340 does not consider the title and description of annotation 350 data set.

Annotation 350 is the same as annotation 320. Basically, both dataset of training and testing pass by the same process. This process is a labelling process, which can use a heuristic, such as that discussed above.

For a given report, Test Step 340 computes scores given for each feature. In this illustrative example, test step 340 determines a score for each label, and returns the label with highest score. Annotation 350 is verified by comparing the labels predicted by model M(·) against the labels given in the process of annotation 320.

Figure 4:
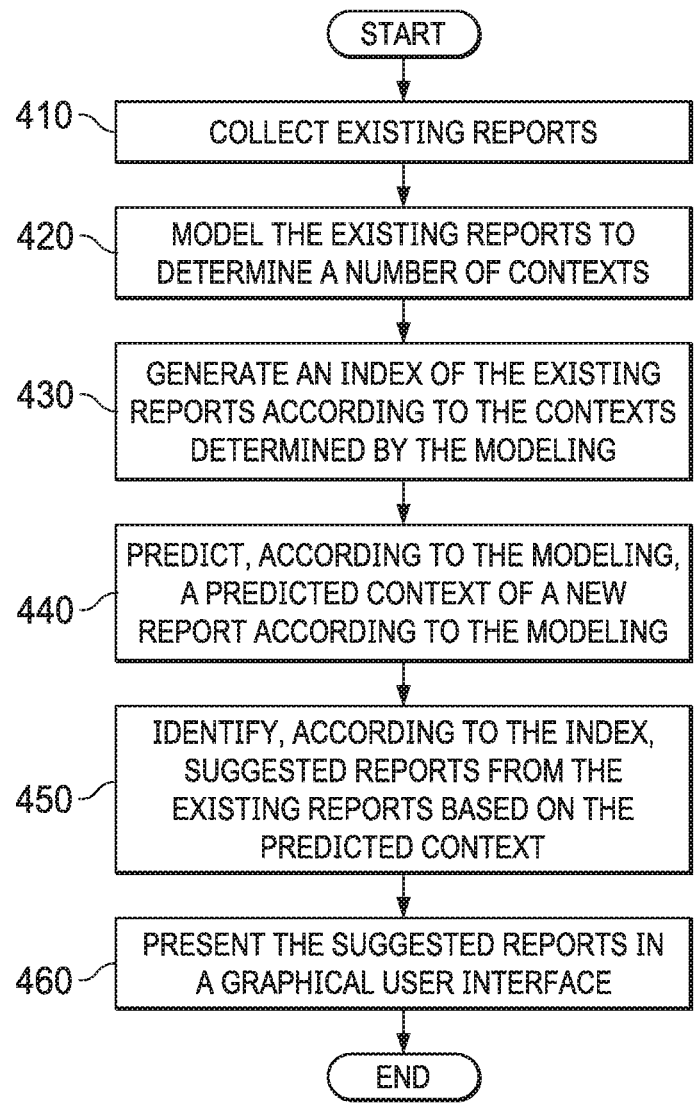
FIG. 4 is a flowchart illustrating a process for managing reports depicted in accordance with an illustrative embodiment.

With reference next to FIG. 4, a flowchart illustrating a process for managing reports is depicted in accordance with an illustrative embodiment. The process of FIG. 4 can be implemented in one or more components of computer system 210 of FIG. 2.

The process begins by collecting existing reports (step 410). Each existing report can include a number of fields, such as a title field, a description field, and at least one other field. The process models the existing reports to determine a number of contexts of the system reports (step 420). The process generates an index of the existing reports according to the context determined (step 430).

The process predicts, according to the modeling, a predicted context of a new report (step 340). According to the index generated, the process identifies suggested reports based on the predicted context of the new report (step 350). The process then presents the suggested reports in a graphical user interface (step 360) and terminates thereafter.

Figure 5:
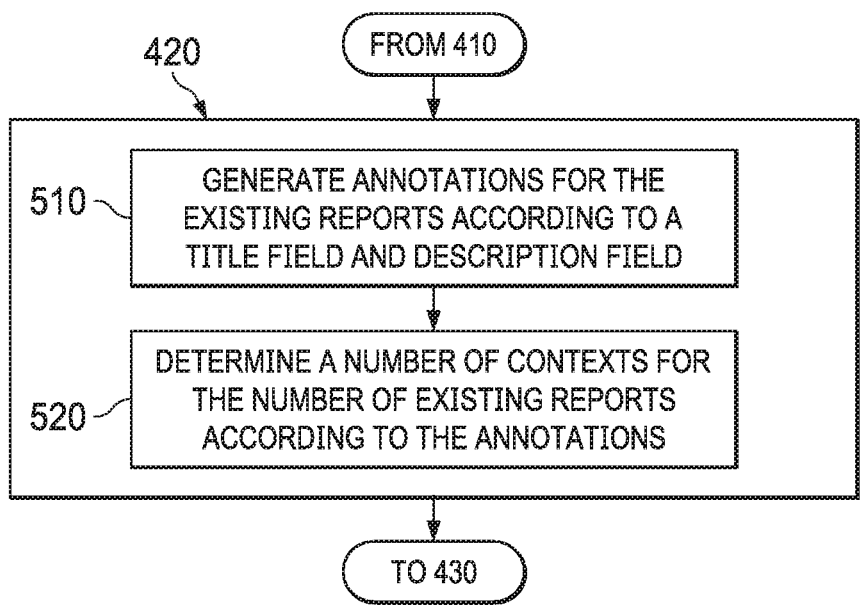
FIG. 5 is a process for modeling existing reports depicted according to an illustrative example.

With reference next to FIG. 5, a process for modeling existing reports is depicted according to an illustrative example. The process of FIG. 5 is an example of one embodiment in which process step 420 of FIG. 4 can be implemented.

Continuing from step 410, the process generates annotations for the existing reports according to a title field and description field (step 510). The process determines a number of contexts for the number of existing reports according to the annotations (step 520). Thereafter, the process continues to step 430 of FIG. 4.

Figure 6:
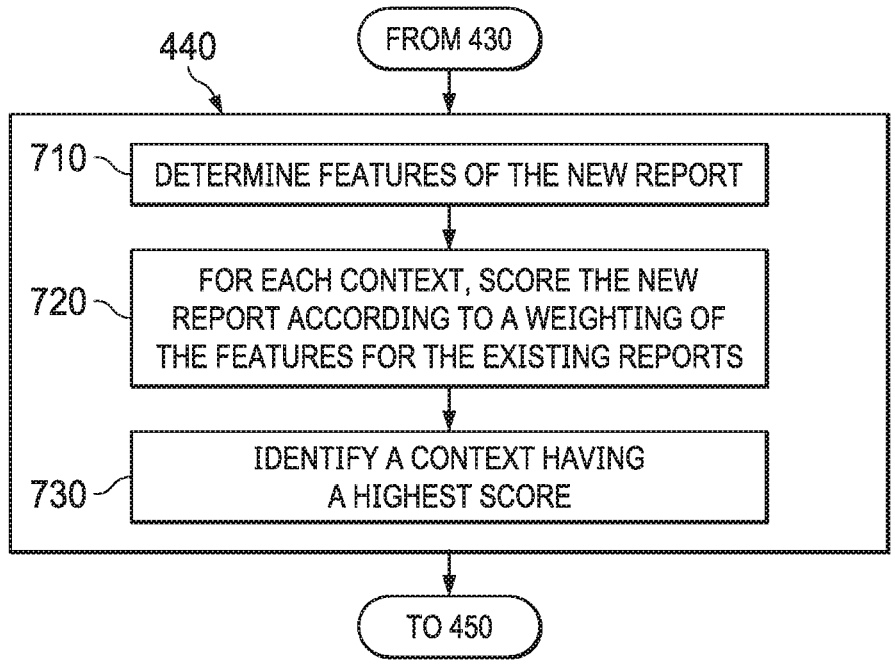
FIG. 6 is a process for scoring features of existing reports depicted according to an illustrative example.

With reference next to FIG. 6, a process for scoring features of existing reports is depicted according to an illustrative example. The process of FIG. 6 can be implemented in conjunction with process 500 of FIG. 5, as part of process step 420 of FIG. 4.

Continuing from step 520, the process determines, according to the at least one other field of the existing reports, a number of features (step 610). For each context, the process weighs the number of features based on a normalized accounting of the features within the context (step 620). Thereafter, the process continues to step 430 of FIG. 4.

Figure 7:
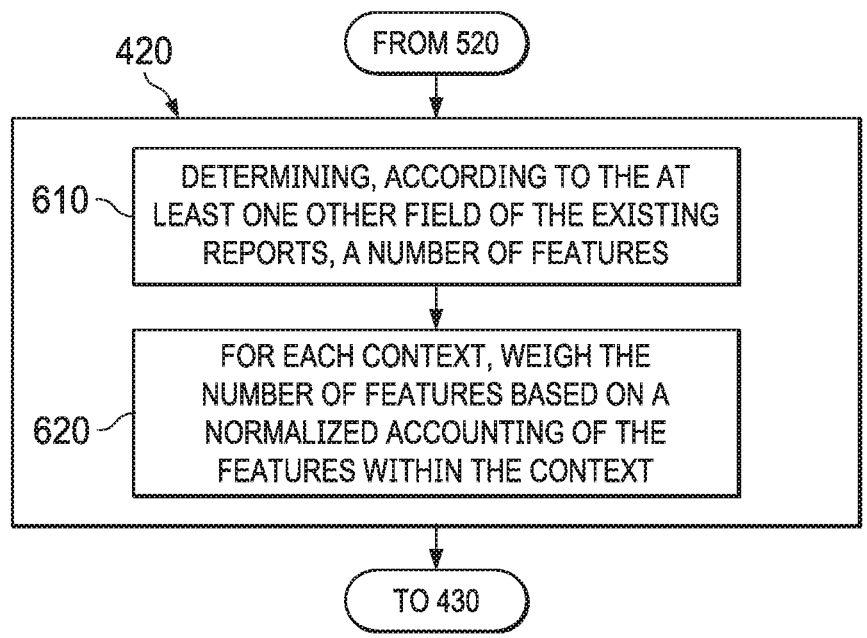
FIG. 7 is a process for predicting a context for a new report depicted according to an illustrative example.

With reference next to FIG. 7, a process for predicting a context for a new report is depicted according to an illustrative example. The process of FIG. 7 is an example of one embodiment in which process step 440 of FIG. 4 can be implemented.

The process determines features for the new report (step 710). For each context, the process scores the new report according to weights for the features of the existing reports (step 720). The process then identifies the context having the highest score (step 730). Thereafter, the process continues to step 450 of FIG. 4.

Figure 8:
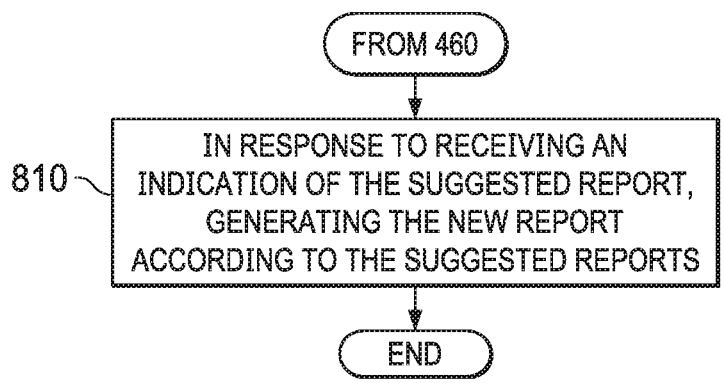
FIG. 8 is a process for generating a new report is depicted according to an illustrative example.

With reference next to FIG. 8, a process for generating a new report is depicted according to an illustrative example. The process of FIG. 8 can be implemented in conjunction with the process of FIG. 4.

Continuing from step 460, the process generates the new report according to suggested the reports (step 810). The new report can be generated in response to receiving an indication from the user that selects one or more of the suggested reports. The process terminates thereafter.

Figure 9:
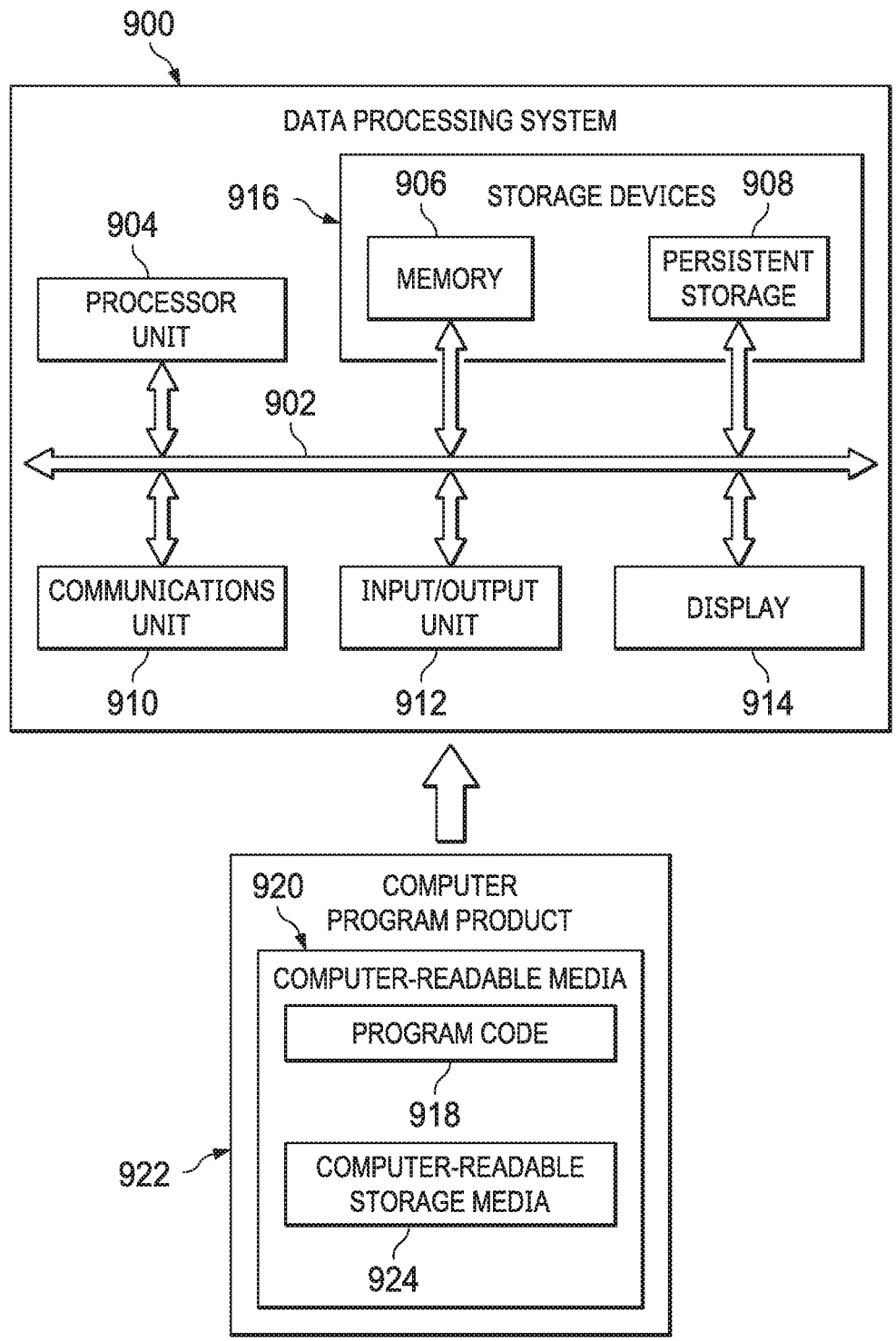
FIG. 9 an illustration of a block diagram of a data processing system is depicted in accordance with an illustrative embodiment.

Turning now to FIG. 9, an illustration of a block diagram of a data processing system is depicted in accordance with an illustrative embodiment. Data processing system 900 may be used to implement one or more computers and client computer 112 in FIG. 1. In this illustrative example, data processing system 900 includes communications framework 902, which provides communications between processor unit 904, memory 906, persistent storage 908, communications unit 910, input/output unit 912, and display 914. In this example, communications framework 902 may take the form of a bus system.

Processor unit 904 serves to execute instructions for software that may be loaded into memory 906. Processor unit 904 may be a number of processors, a multi-processor core, or some other type of processor, depending on the particular implementation. In an embodiment, processor unit 904 comprises one or more conventional general-purpose central processing units (CPUs). In an alternate embodiment, processor unit 904 comprises one or more graphical processing units (GPUS).

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer-readable storage devices in these illustrative examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908. Communications unit 910, in these illustrative examples, provides for communications with other data processing systems or devices. In these illustrative examples, communications unit 910 is a network interface card.

Input/output unit 912 allows for input and output of data with other devices that may be connected to data processing system 900. For example, input/output unit 912 may provide a connection for user input through at least one of a keyboard, a mouse, or some other suitable input device. Further, input/output unit 912 may send output to a printer. Display 914 provides a mechanism to display information to a user.

Instructions for at least one of the operating system, applications, or programs may be located in storage devices 916, which are in communication with processor unit 904 through communications framework 902. The processes of the different embodiments may be performed by processor unit 904 using computer-implemented instructions, which may be located in a memory, such as memory 906.

These instructions are referred to as program code, computer-usable program code, or computer-readable program code that may be read and executed by a processor in processor unit 904. The program code in the different embodiments may be embodied on different physical or computer-readable storage media, such as memory 906 or persistent storage 908.

Program code 918 is located in a functional form on computer-readable media 920 that is selectively removable and may be loaded onto or transferred to data processing system 900 for execution by processor unit 904. Program code 918 and computer-readable media 920 form computer program product 922 in these illustrative examples. In one example, computer-readable media 920 may be computer-readable storage media 924 or computer-readable signal media 926.

In these illustrative examples, computer-readable storage media 924 is a physical or tangible storage device used to store program code 918 rather than a medium that propagates or transmits program code 918. Alternatively, program code 918 may be transferred to data processing system 900 using computer-readable signal media 926.

Computer-readable signal media 926 may be, for example, a propagated data signal containing program code 918. For example, computer-readable signal media 926 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 900 are not meant to provide architectural limitations to the manner in which different embodiments may be implemented. The different illustrative embodiments may be implemented in a data processing system including components in addition to or in place of those illustrated for data processing system 900. Other components shown in FIG. 9 can be varied from the illustrative examples shown. The different embodiments may be implemented using any hardware device or system capable of running program code 918.

The illustrative embodiments described herein provide a computer-implemented a method, computer system, and computer program product for generating reports. Existing reports are collected and modeled to determine a number of contexts. An index of the existing reports is generated according the contexts determined by the modeling, a predicted context of a new report is predicted according to the modeling. According to the index, suggested reports are identified based on the predicted context for the new report. The suggested reports are presented in a graphical user interface.

Therefore, the illustrative embodiments described herein provide a technical solution to the technical problem of generating reports provides a technical effect in which a new reports are generated more easily and quickly while requiring less knowledge or training from an operator.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system of predictive index-based selection via mapped features, comprising:

a data processing system comprising one or more processors, coupled with memory, to:

train, using machine learning, a model to generate a context that indicates an intent of a report, wherein the machine learning trains the model with a first plurality of reports comprising a plurality of fields that are associated with a plurality of features, and based on: (i) identifying the plurality of features associated with the plurality of fields, and (ii) generating one or more annotations indicative of the context for each of the first plurality of reports according to one or more of the plurality of fields relevant to the corresponding one of the first plurality of reports;

generate, using the model, a plurality of contexts and the plurality of features for a second plurality of reports according to the one or more annotations using the plurality of fields within the second plurality of reports;

determine, via the model, a plurality of weights for the plurality of features based on occurrences of the plurality of features within the plurality of contexts;

generate an index of the second plurality of reports that maps the plurality of weights for the plurality of features with the plurality of contexts;

receive, from a computing device remote from the data processing system, a request to execute a second report that is different from the second plurality of reports for which the data processing system generated using the model;

determine one or more second features for the second report based on the model trained with the machine learning according to at least the plurality of features;

score, according to an output of the model using the plurality of weights for the plurality of features as inputs, the one or more second features for the second report to identify a highest scoring feature of the one or more second features;

select, from the index mapping the plurality of weights for the plurality of features with the plurality of contexts, a suggested report from the second plurality of reports that corresponds to a context of the plurality of contexts for the second plurality of reports with the highest scoring feature; and enable, in response to the selection, a display of the suggested report via a display device to cause execution of the second report responsive to the request.

2. The system of claim 1, wherein the data processing system is further configured to determine, via the model, the plurality of weights for the plurality of features based on a normalization of occurrences of the plurality of features within the plurality of contexts.

3. The system of claim 1, wherein the plurality of contexts are generated based on at least a title field and a description field.

4. The system of claim 1, wherein the data processing system is further configured to:
determine a field in the suggested report different from the plurality of fields in the second plurality of reports; and
complete the second report according to the field from the suggested report.

5. The system of claim 1, wherein the data processing system is further configured to generate the plurality of contexts for the second plurality of reports based on an extraction of the plurality of contexts from the one or more annotations with an annotation heuristic.

6. The system of claim 1, wherein the plurality of features comprise a type of filter.

7. The system of claim 1, wherein the data processing system is further configured to determine, via the model, the plurality of weights for the plurality of features based on a parameter optimizer which ranks a relevance of each feature of the plurality of features.

8. The system of claim 1, wherein the data processing system is further configured to validate an accuracy of the machine learning, by the model, according to validation data included in the first plurality of reports.

9. The system of claim 1, wherein the data processing system is further configured to generate the index of the second plurality of reports responsive to a validation of an accuracy of the machine learning.

10. The system of claim 1, wherein the data processing system is further configured to:
analyze, by the model, validation data included in the first plurality of reports; and
determine, by the model, that the machine learning used to train the model reaches a threshold accuracy.

11. A method of predictive index-based selection via mapped features, comprising:
training, by a data processing system comprising one or more processors coupled with memory, using machine learning, a model to generate a context that indicates an intent of a report, wherein the machine learning trains the model with a first plurality of reports comprising a plurality of fields that are associated with a plurality of features, and based on: (i) identifying the plurality of features associated with the plurality of fields, and (ii) generating one or more annotations indicative of the context for each of the first plurality of reports according to one or more of the plurality of fields relevant to the corresponding one of the first plurality of reports;

generating, by the data processing system, using the model, a plurality of contexts and the plurality of features for a second plurality of reports according to the one or more annotations using the plurality of fields within the second plurality of reports;

determining, by the data processing system via the model, a plurality of weights for the plurality of features based on occurrences of the plurality of features within the plurality of contexts;

generating, by the data processing system, an index of the second plurality of reports that maps the plurality of weights for the plurality of features with the plurality of contexts;

receiving, by the data processing system, from a computing device remote from the data processing system, a request to execute a second report that is different from the second plurality of reports for which the data processing system generated using the model;

determining, by the data processing system, one or more second features for the second report based on the model trained with the machine learning according to at least the plurality of features;

scoring, by the data processing system, according to an output of the model using the plurality of weights for the plurality of features as inputs, the one or more second features for the second report to identify a highest scoring feature of the one or more second features;

selecting, by the data processing system, from the index mapping the plurality of weights for the plurality of features with the plurality of contexts, a suggested report from the second plurality of reports that corresponds to a context of the plurality of contexts for the second plurality of reports with the highest scoring feature; and enabling, by the data processing system, in response to the selection, a display of the suggested report via a display device to cause execution of the second report responsive to the request.

12. The method of claim 11, further comprising determining, via the model, the plurality of weights for the plurality of features based on a normalization of occurrences of the plurality of features within the plurality of contexts.

13. The method of claim 11, wherein the plurality of contexts are generated based on at least a title field and a description field.

14. The method of claim 11, further comprising:
determining a field in the suggested report different from the plurality of fields in the second plurality of reports; and
completing the second report according to the field from the suggested report.

15. The method of claim 11, further comprising generating the plurality of contexts for the second plurality of reports based on an extraction of the plurality of contexts from the one or more annotations with an annotation heuristic.

16. The method of claim 11, further comprising determining, via the model, the plurality of weights for the plurality of features based on a parameter optimizer which ranks a relevance of each feature of the plurality of features.

17. The method of claim 11, further comprising validating an accuracy of the machine learning, by the model, according to validation data included in the first plurality of reports.

18. The method of claim 11, further comprising generating the index of the second plurality of reports responsive to a validation of an accuracy of the machine learning.

19. The method of claim 11, further comprising:
analyzing, by the model, validation data included in the first plurality of reports; and
determining, by the model, that the machine learning used to train the model reaches a threshold accuracy.

20. A non-transitory computer-readable medium storing processor executable instructions for predictive index-based selection via mapped features that, when executed by one or more processors, cause the one or more processors to:
train, using machine learning, a model to generate a context that indicates an intent of a report, wherein the machine learning trains the model with a first plurality of reports comprising a plurality of fields that are associated with a plurality of features, and based on: (i) identifying the plurality of features associated with the plurality of fields, and (ii) generating one or more annotations indicative of the context for each of the first plurality of reports according to one or more of the plurality of fields relevant to the corresponding one of the first plurality of reports;
generate, using the model, a plurality of contexts and the plurality of features for a second plurality of reports according to the one or more annotations using the plurality of fields within the second plurality of reports;
determine, via the model, a plurality of weights for the plurality of features based on occurrences of the plurality of features within the plurality of contexts;
generate an index of the second plurality of reports that maps the plurality of weights for the plurality of features with the plurality of contexts;
receive, from a computing device remote from the one or more processors, a request to execute a second report that is different from the second plurality of reports for which the one or more processors generated using the model;
determine one or more second features for the second report based on the model trained with the machine learning according to at least the plurality of features;
score, according to an output of the model using the plurality of weights for the plurality of features as inputs, the one or more second features for the second report to identify a highest scoring feature of the one or more second features;
select, from the index mapping the plurality of weights for the plurality of features with the plurality of contexts, a suggested report from the second plurality of reports that corresponds to a context of the plurality of contexts for the second plurality of reports with the highest scoring feature; and
enable, in response to the selection, a display of the suggested report via a display device to cause execution of the second report responsive to the request.

* * * * *